United States Patent
Jeon et al.

(10) Patent No.: US 9,644,064 B2
(45) Date of Patent: May 9, 2017

(54) OLEFIN BLOCK COPOLYMER

(71) Applicant: LG CHEM, LTD., Seoul (KR)

(72) Inventors: Man-Seong Jeon, Daejeon (KR); Ki-Soo Lee, Daejeon (KR); Yong-Ho Lee, Incheon (KR); Heon-Yong Kwon, Daejeon (KR); Min-Seok Cho, Daejeon (KR); Seon-Kyoung Kim, Daejeon (KR); Kyoung-Chan Lim, Daejeon (KR); Dae-Sik Hong, Gunpo-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/177,942

(22) Filed: Jun. 9, 2016

(65) Prior Publication Data
US 2016/0289365 A1  Oct. 6, 2016

Related U.S. Application Data (62) Division of application No. 13/980,930, filed as application No. PCT/KR2012/000632 on Jan. 27, 2012, now abandoned.

(30) Foreign Application Priority Data

Jan. 27, 2011 (KR) .................. 10-2011-0008447

(51) Int. Cl.
| | | |
|---|---|---|
| C08F 210/00 | (2006.01) | |
| C08F 10/14 | (2006.01) | |
| C08F 110/06 | (2006.01) | |
| C08F 110/02 | (2006.01) | |
| C08F 297/08 | (2006.01) | |
| C08F 299/00 | (2006.01) | |
| C08L 23/16 | (2006.01) | |

(52) U.S. Cl.
CPC ........ *C08F 297/083* (2013.01); *C08F 297/08* (2013.01); *C08F 299/00* (2013.01); *C08L 23/16* (2013.01)

(58) Field of Classification Search
CPC ...... C08F 299/00; C08F 297/08; C08L 53/00; C08L 23/16
USPC .............................. 526/348, 348.2, 352, 351
See application file for complete search history.

(56) References Cited

U.S. PATENT DOCUMENTS

2010/0240818 A1* 9/2010 Walton .................... C08L 23/06
524/505

FOREIGN PATENT DOCUMENTS

| | | |
|---|---|---|
| CN | 102574885 A | 7/2012 |
| JP | 2009269374 A | 11/2009 |
| KR | 10-2007-0098276 A | 10/2007 |
| KR | 10-2010-0067627 A | 6/2010 |

(Continued)

*Primary Examiner* — William Cheung
(74) *Attorney, Agent, or Firm* — Dentons US LLP (57) ABSTRACT

The present description relates to an olefin block copolymer with excellences in elasticity, heat resistance, and processability. The olefin block copolymer comprises a plurality of blocks or segments, each comprising an ethylene or propylene repeating unit and an α-olefin repeating unit at different mole fractions. The olefin block copolymer comprises polymer chains containing 20 to 100 short-chain branches (SCBs) per 1,000 carbon atoms. A point where a first derivative of the number Y of the SCBs per 1,000 carbon atoms of each polymer chain with respect to the molecular weight X of the polymer chain is 0 exists between the minimum and maximum values of the molecular weight X.

9 Claims, 3 Drawing Sheets

(56) References Cited

FOREIGN PATENT DOCUMENTS

| | | |
|---|---|---|
| KR | 10-2010-0102854 A | 9/2010 |
| KR | 10-2010-0107510 A | 10/2010 |
| KR | 10-2011-0013286 A | 2/2011 |
| WO | 2008136621 A1 | 11/2008 |

* cited by examiner

OLEFIN BLOCK COPOLYMER

RELATED APPLICATIONS

This application is a divisional application of U.S. patent application Ser. No. 13/980,930, filed Jul. 22, 2013 (now abandoned), which application is a National Stage Entry of International Application No. PCT/KR2012/000632, filed Jan. 27, 2012, and claims the benefit of and priority to Korean Application No. 10-2011-0008447, filed Jan. 27, 2011, all of which are incorporated herein by reference in their entirety for all purposes as if fully set forth herein.

TECHNICAL FIELD

The present description relates to an olefin block copolymer.

BACKGROUND

A block copolymer, which refers to a copolymer containing a plurality of blocks or segments of repeating units, tends to be superior in characteristics to typical random copolymers or polymer blends. For example, the block copolymer may include both of soft elastic blocks (referred to as "soft segments") and hard crystalline blocks (referred to as "hard segments,") and thus have good properties, such as excellent elasticity and heat resistance. More specifically, such a block copolymer has elasticity at a temperature equal to or higher than the glass transition temperature of the soft segments and shows a thermoplastic behavior at a temperature above the melting temperature, consequently with relatively good heat resistance.

For specific examples of the block copolymer, SBS (styrene-butadiene-styrene) triblock copolymers and their hydrogenated versions (e.g., SEBS) are known for their usefulness in a variety of applications since they have good characteristics regarding heat resistance and elasticity.

Recently, the use of olefin-based elastomers, which are a copolymer of ethylene/propylene and α-olefin, has been intensively under consideration. More specifically, many attempts have been made to use the olefin-based elastomers in a variety of applications, such as for use purposes as a substitute for rubber materials. For further improvement on the heat resistance of the olefin-based elastomers, there has been an attempt to use block copolymer type elastomers in place of the conventional random copolymer type olefin-based elastomers such as ethylene-α-olefin random copolymers.

In spite of those attempts, however, the study for commercialization of olefin-based elastomers with enhanced heat resistance has already reached its limit. Moreover, the conventional block copolymer type olefin-based elastomers also encounter a limitation that they are susceptible to deterioration of processability during the melt processing. Accordingly, there have been consistent demands for olefin-based elastomers with enhanced heat resistance and processability.

SUMMARY

The present description provides an olefin block copolymer with excellences in elasticity, heat resistance, and processability.

In accordance with an embodiment of the present description, there is provided an olefin block copolymer comprising a plurality of blocks or segments, each comprising an ethylene or propylene repeating unit and an α-olefin repeating unit at different mole fractions. The olefin block copolymer comprises polymer chains containing 20 to 100 short-chain branches (SCBs) per 1,000 carbon atoms. A point where a first derivative of the number Y of the SCBs per 1,000 carbon atoms of each polymer chain with respect to the molecular weight X of the polymer chain is 0 exists between the minimum and maximum values of the molecular weight X, for example, in the bottom about 10 to 90% of the molecular weight X, in the bottom about 20 to 70% of the molecular weight X, or in the bottom about 25 to 60% of the molecular weight X. In this regard, the point where the first derivative is 0 may exist in a region below the maximum peak molecular weight Mp of the block copolymer.

In the block copolymer of one embodiment, the first derivative is a positive number in a region where the molecular weight X is less than at the point where the first derivative is 0. Further, the first derivative is a negative number in a region where the molecular weight X is greater than at the point where the first derivative is 0.

The olefin block copolymer may have a crystallization temperature Tc of about 95 to 120° C. and a melting temperature of about 110 to 135° C.

The olefin block copolymer may comprise, as a plurality of blocks or segments, a hard segment comprising a first mole fraction of the α-olefin repeating unit and a soft segment comprising a second mole fraction of the α-olefin repeating unit, where the second mole fraction is greater than the first mole fraction. In this regard, the mole fraction of the α-olefin repeating unit contained in the entire block copolymer may have a value between the first and second mole fractions.

Further, the olefin block copolymer may comprise 20 to 95 mol. % of the hard segment and 5 to 80 mol. % of the soft segment. The hard segment may have a higher value than the soft segment in at least one of the properties, including the degree of crystallization, density, and melting temperature.

The above-described olefin block copolymer may comprise about 80 to 98 mol. % of the ethylene or propylene repeating unit and a remaining content of the α-olefin repeating unit, and have a density of about 0.85 to 0.92 g/cm$^3$. Further, the olefin block copolymer may have a weight average molecular weight of 5,000 to 3,000,000 and a molecular weight distribution of 2.5 to 6.

In the olefin block copolymer, the α-olefin repeating unit may be a repeating unit derived from at least one α-olefin selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

The present description can provide an olefin block copolymer that exhibits enhanced processability as well as excellences in heat resistance and elasticity. Particularly, such an olefin block copolymer can be prepared through a simple process using a simplified catalyst system.

Therefore, the olefin block copolymer contributes to the commercialization of olefin-based elastomers with excellences in heat resistance and other general properties, and such olefin-based elastomers can be appropriately used as a substitute for rubber materials in a wide range of applications.

DETAILED DESCRIPTION OF THE EMBODIMENTS

Hereinafter, a detailed description will be given as to the olefin block copolymer and its preparation method according to the embodiments of the present description. However, these embodiments are provided as a mere illustration and not intended to limit the scope of the invention. Moreover, it is apparent to those skilled in the art that the embodiments may be modified in many ways.

Unless stated otherwise, some terms as used in the entire specification may be defined as follows.

The term "(olefin) block copolymer" as used herein refers to a copolymer of ethylene or propylene and α-olefin, which copolymer comprises a plurality of blocks or segments of repeating units that are distinguishable from one another in terms of at least one of the physical or chemical properties, such as, for example, the content (mole fraction) of the ethylene- or propylene-derived repeating unit, the content (mole fraction) of the α-olefin-derived repeating unit, the degree of crystallization, density, or melting temperature.

A plurality of the blocks or segments may comprise, for example, an ethylene or propylene repeating unit and an α-olefin repeating unit on the condition that the repeating units are contained at different contents (mole fractions). For example, the plural blocks or segments may comprise a hard segment that is a hard crystalline block containing a first mole fraction of the α-olefin repeating unit and a soft segment that is a soft elastic block containing a second mole fraction of the α-olefin repeating unit. Here, the second mole fraction is greater than the first mole fraction. In this regard, the first mole fraction may be lower than the mole fraction of the α-olefin repeating unit as measured for the entire block copolymer, while the second mole fraction may be higher than the mole fraction of the α-olefin repeating unit for the entire block copolymer.

In addition, the plural blocks or segments may be distinguishable from one another in terms of at least one of the properties, including the degree of crystallization, density, and melting temperature. In comparison with the soft segment that is a soft elastic block, for example, the hard segment that is a hard crystalline block may have a higher value in terms of at least one or two properties of the degree of crystallization, density, and melting temperature.

The term "polymer chain(s)" included in the "(olefin) block copolymer" refers to a number of polymer chains formed by polymerization and production of the block copolymer. For example, when the block copolymer is prepared by polymerizing ethylene or propylene with α-olefin, a number of polymer chains each containing an ethylene or propylene repeating unit and an α-olefin repeating unit and having different molecular weights are formed to constitute the block copolymer. The molecular weight of the polymer chains can be determined from a molecular weight distribution curve elicited by using gel permeation chromatography (GPC). Further, the distribution of the α-olefin repeating unit or short-chain branches derived from the α-olefin repeating unit contained in the polymer chain can be determined through an FT-IR analysis on the block copolymer. The content of the α-olefin repeating unit in the polymer chain or the block copolymer can be calculated through $^1$H-NMR analysis. These polymer chains can be defined as "polymer chain(s)" contained in the "(olefin) block copolymer".

The term "maximum peak molecular weight Mp" of the "(olefin) block copolymer" refers to the molecular weight of the polymer chains included in the block copolymer at the highest content when the "polymer chains" in the block copolymer are arranged in value order of the molecular weight from lowest to highest. The "maximum peak molecular weight Mp" can be determined from a molecular weight distribution curve of the block copolymer elicited by using gel permeation chromatography (GPC). In the molecular weight distribution curve, for example, the X-axis represents the molecular weight of each polymer chain or its log value, and the Y-axis is defined as a function of the content of the polymer chain. The molecular weight X at the point where Y is at the maximum in the distribution curve (i.e., the molecular weight X at the vertex of the distribution curve) is referred to as "the maximum peak molecular weight Mp".

The expression "the molecular weight of the polymer chain(s) is in the bottom A % or less (or greater) or in the bottom less (or greater) than A %" means that the molecular weight is equal to and/or less (or greater) than the molecular weight of a polymer chain which is the $A^{th}$ percentile from the lowest when the polymer chains are arranged in value order of the molecular weight from lowest to highest (for example, the polymer chain having the $4^{th}$ lowest molecular weight out of 10 polymer chains, if A % is 40%). Similarly, the expression "the molecular weight of the polymer chain is in the top A % or less (or greater) or in the top less (or greater) than A %" means that its molecular weight is equal to and/or less (or greater) than the molecular weight of a polymer chain which is the $A^{th}$ percentile from the highest when the polymer chains are arranged in value order of the molecular weight from lowest to highest.

The term "short-chain branch (SCB)" in the "(olefin) block copolymer" refers to a chain branching from the longest main chain in each of the polymer chains. The number of the short-chain branches (SCBs) can be determined from the FT-IR analysis of the block copolymer and proportional to the mole fraction of the α-olefin repeating unit contained in the block copolymer or the polymer chain(s).

In accordance with one exemplary embodiment of the present description, there is provided an olefin block copolymer that comprises a plurality of blocks or segments, each comprising an ethylene or propylene repeating unit and an α-olefin repeating unit at different mole fractions. The olefin block copolymer comprises polymer chains containing 20 to 100 short-chain branches (SCBs) per 1,000 carbon atoms. A point where a first derivative of the number Y of the SCBs per 1,000 carbon atoms of each polymer chain with respect to the molecular weight X of the polymer chain is 0 exists between the minimum and maximum values of the molecular weight X. In the olefin block copolymer, the point where the first derivative is 0 may exist, for example, in the bottom about 10 to 90% of the molecular weight X, in the bottom about 20 to 70% of the molecular weight X, or in the bottom about 25 to 60% of the molecular weight X. In one specific example, the point where the first derivative is 0 may exist in a region below the maximum peak molecular weight Mp of the block copolymer.

The olefin block copolymer of the embodiment is prepared by copolymerization of ethylene or propylene with α-olefin, so it contains an ethylene- or propylene-derived repeating unit and an α-olefin-derived repeating unit and thus benefits from the inclusion of the α-olefin repeating unit derived from α-olefin to have good elasticity.

As the olefin block copolymer is prepared using the after-mentioned catalyst system, it has a defined SCB distribution characteristic according to the molecular weight of the polymer chains included. More specifically, each polymer chain included in the block copolymer may contain, per 1,000 carbon atoms, about 20 to 100 short-chain branches (SCBs), about 25 to 95 SCBs, about 25 to 90 SCBs, or about 25 to 85 SCBs. As will be hereinafter described in further detail, the block polymer has a tendency of the SCB distribution that the number of SCBs in each polymer chain increases with an increase in the molecular weight of the polymer chains in the block copolymer and then decreases with an increase in the molecular weight of the polymer chains after a defined point, for example, a point where the first derivative is 0. Such a SCB distribution characteristic implicitly shows that the polymer chains contained in the block copolymer comprise a block or segment containing a higher content of the α-olefin repeating unit.

Such a characteristic of the block copolymer presumably results from the fact that the block copolymer has a blocked form of a plurality of blocks or segments distinct in physical or chemical properties from one another, because it is prepared by using the after-mentioned specific catalyst system. In other words, the block copolymer according to one embodiment as prepared by using the after-mentioned specific catalyst system consists of a block or segment formed by polymerization and coupling of monomers including a relatively high content of ethylene or propylene, and another block or segment formed by polymerization and coupling of monomers including a relatively high content of α-olefin. As such, the block copolymer according to the embodiment can exhibit a relatively high degree of crystallization and the aforementioned SCB distribution characteristic.

More specifically, such a block copolymer may include a plurality of blocks or segments, each containing an ethylene or propylene repeating unit and an α-olefin repeating unit at different mole fractions. For example, the block copolymer may include hard segments which are hard crystalline blocks containing a first mole fraction of the α-olefin repeating unit, and soft segments which are soft elastic blocks containing a second mole fraction of the α-olefin repeating unit, where the second mole fraction is greater than the first mole fraction. In this regard, the mole fraction of the α-olefin repeating unit included in the entire block copolymer may have a value between the first and second mole fractions. In other words, the first mole fraction can be lower than the mole fraction of the α-olefin repeating unit calculated for the entire block copolymer, while the second mole fraction is higher than the mole fraction of the α-olefin repeating unit calculated for the entire block copolymer.

In this manner, the olefin block copolymer of the embodiment has such a blocked form as can be seen from the aforementioned SCB distribution characteristic. For example, as the block copolymer includes hard segments that are hard crystalline blocks with a higher mole fraction of the ethylene or propylene repeating unit, it can have a high melting temperature Tm of about 110 to 135° C., about 115 to 130° C., or about 115 to 125° C. This melting temperature range is relatively high with respect to the melting temperature range of the conventional olefin-based elastomers. Therefore, the block copolymer of the embodiment can have more enhanced heat resistance than the olefin-based elastomers such as known ethylene-α-olefin random copolymers and exhibit good elasticity as an elastomer even at a higher temperature.

Further, the block copolymer of the embodiment is characterized by the fact that a point where a first derivative of the number Y of short-chain branches per 1,000 carbon atoms of each polymer chain with respect to the molecular weight X of the polymer chain is 0 exists between the minimum and maximum values of the molecular weight X. In the olefin block copolymer, the point where the first derivative is 0 may exist, for example, in the bottom about 10 to 90% of the molecular weight X, in the bottom about 20 to 70% of the molecular weight X, or in the bottom about 25 to 60% of the molecular weight X. In one specific example, the point where the first derivative is 0 may exist in a region below the maximum peak molecular weight Mp of the block copolymer.

Such a distribution characteristic can be determined by performing a gel permeation chromatography (GPC) on the block copolymer to elicit a molecular weight distribution curve for the polymer chains included in the block copolymer, and an FT-IR analysis on the block copolymer to analyze the number of short-chain branches per 1,000 carbon atoms as a function of the molecular weight of the polymer chains and elicit a distribution curve showing the relationship between the number of short-chain branches and the molecular weight of the polymer chains. Examples of the distribution curve are shown as the red curves of FIGS. 1 and 2.

As can be seen from an example of the distribution curve, the point where the first derivative is 0 (for example, the vertices of the red curves in FIGS. 1 and 2) exists in a defined region between the minimum and maximum values of the molecular weight of the polymer chains included in the block copolymer of the exemplary embodiment. In the region where the molecular weight of the polymer chains is less than at the point where the first derivative is 0, the number of short-chain branches included in each polymer chain increases with an increase in the molecular weight of the polymer chain, so the first derivative is a positive number. Contrarily, in the region where the molecular weight of the polymer chains is greater than at the point where the first derivative is 0, the number of short-chain branches included in each polymer chain decreases with an increase in the molecular weight of the polymer chain, rendering the first derivative to be a negative number. In other words, the block copolymer of the embodiment comprises polymer chains with different molecular weights and has a characteristic that the polymer chains with a relatively low molecular weight have an increase in the number of short-chain branches and a higher content of the α-olefin repeating unit with an increase in the molecular weight, while the polymer chains with a relatively high molecular weight have a decrease in the number of short-chain branches and a lower content of the α-olefin repeating unit even with an increase in the molecular weight. Further, the point where the first derivative is 0 exists between the regions showing the respective characteristics.

Such a distribution characteristic implicitly shows the crystal property and the blocking characteristic peculiar to the block copolymer of the embodiment, so the block copolymer may have a high crystallization temperature Tc of about 95 to 120° C., about 100 to 115° C., or about 102 to 110° C. As the block copolymer has such a unique crystal property and a relatively high crystallization temperature, faster crystallization occurs after melting during the melt processing of the block copolymer to ensure a rapid molding. Thus, the block copolymer of the embodiment can be excellent in processability and formability. Particularly, the above-described SCB distribution characteristic corresponds to the novel characteristic of the block copolymer newly discovered in the present description. It is revealed from the after-mentioned Examples that the block copolymer of the embodiment with such a novel crystal property is much fast in crystallization and processing after being melted, consequently with excellent formability.

On the other hand, a plurality of blocks or segments contained in the block copolymer of the embodiment, such as, for example, hard and soft segments are distinguishable from one another by at least one of the properties, including the degree of crystallization, density, or melting temperature. For example, the hard segment that is a hard crystalline block containing a relatively high mole fraction of an ethylene or propylene repeating unit may have a higher value in at least one of the properties, including the degree of crystallization, density, and melting temperature, in comparison with the soft segment that is a soft elastic block containing a relatively high mole fraction of an α-olefin repeating unit. This presumably results from the higher crystallinity of the hard segment. These properties of each block or segment can be determined and/or classified by preparing a (co)polymer corresponding to each block or segment and measuring its properties.

As the block copolymer of the embodiment includes a plurality of blocks or segments distinct from one another in properties, it can exhibit good heat resistance as well as excellent elasticity. For example, the block copolymer not only has excellent elasticity as a benefit from the inclusion of a soft segment that is a soft elastic block but maintains good properties such as high melting temperature and excellent elasticity due to inclusion of a hard segment that is a crystalline block having a relatively high melting temperature. Consequently, the block copolymer can exhibit good heat resistance.

Further, the block copolymer of the embodiment may include an ethylene or propylene repeating unit at a content (mole fraction) of about 80 to 98 mol. %, about 80 to 93 mol. %, or about 85 to 95 mol. %. The block copolymer may also comprise an α-olefin repeating unit at a remaining content (i.e., about 2 to 20 mol. %, about 7 to 20 mol. %, or about 5 to 15 mol. %) in addition to the above-defined mole fraction of the ethylene or propylene repeating unit. In this regard, the content of the ethylene or propylene repeating unit in the block copolymer can be determined in consideration of the content of the ethylene or propylene monomer used in the polymerization, or calculated through $^1$H-NMR or $^{13}$C-NMR analysis of the block copolymer.

The block copolymer includes the above-defined mole fraction of the α-olefin repeating unit to exhibit good elasticity as an elastomer and an optimized mole fraction of the ethylene or propylene repeating unit to ensure high melting temperature and good heat resistance.

Further, the block copolymer of one embodiment may comprise about 20 to 95 mol. %, about 25 to 90 mol. %, or about 20 to 85 mol. % of a hard segment and a remaining mole fraction (i.e., about 5 to 80 mol. %, about 10 to 75 mol. %, or about 15 to 80 mol. %) of a soft segment.

In this regard, the mole fraction of the hard segment can be calculated with a time domain NMR (TD NMR) instrument commercially available. More specifically, the TD NMR instrument is used to determine the free induction decay (FID) for a sample of the block copolymer, where the FID is expressed as a function of time and intensity. According to the following Mathematical Formula 1, four constants A, B, T2$_{fast}$, and T2$_{slow}$ are varied to elicit a functional formula most approximating the graph of the aforementioned FID function and thereby to determine the constant values for the sample, such as A, B, T2$_{fast}$, and T2$_{slow}$. For reference, the T2 (spin-spin relaxation time) relaxation for the hard segment as calculated from the functional formula appears fast, while the T2 relaxation for the soft segment is slow. Among the calculated values of A, B, T2$_{fast}$, and T2$_{slow}$, the lower T2 value is determined as the T2 value of the hard segment, that is, T2$_{fast}$, while the higher T2 value is determined as the T2 value of the soft segment, that is, T2$_{slow}$. This process enables it to calculate the mole fraction (mol. %) of the hard segment as well as the constants A and B.

$$\text{Intensity} = A \times \text{EXP}(-\text{Time}/T2_{fast}) + B \times \text{EXP}(-\text{Time}/T2_{slow}) \quad \text{[Mathematical Formula 1]}$$

Determine A, B, T2$_{fast}$, and T2$_{slow}$ by fitting.

$$\text{Hard segment (mol. \%)} = A/(A+B) \times 100$$

In the Mathematical Formula 1, intensity and time are values calculated through the FID analysis; T2$_{fast}$ is the T2 (spin-spin relaxation time) relaxation value for the hard segment; and T2$_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

As described above, among a plurality of blocks or segments contained in the block copolymer, the hard segment means a hard crystalline segment having a relatively high mole fraction of the ethylene or propylene repeating unit, while the soft segment means a soft elastic segment having a relatively high mole fraction of the α-olefin repeating unit. As the block copolymer of the embodiment comprises the hard and soft segments in the defined mole fraction range, it can exhibit high melting temperature and good heat resistance pertaining to the hard segment as well as excellent elasticity caused by the soft segment.

The block copolymer of the embodiment may have a density of about 0.85 to 0.92 g/cm$^3$, about 0.86 to 0.90 g/cm$^3$, or about 0.86 to 0.91 g/cm$^3$ and a weight average molecular weight of about 5,000 to 3,000,000, about 10,000 to 1,000,000, or about 50,000 to 200,000. Further, the block copolymer may have a molecular weight distribution (MWD; Mw/Mn) of about 2.5 to 6, about 2.6 to 5, or about 2.5 to 3.5. As the block copolymer of the embodiment has such properties of density, molecular weight, or the like, it can show appropriate properties as an olefin-based elastomer, good mechanical properties and high processability. Particularly, such a high molecular weight distribution of 2.5 or greater may render the block copolymer of the embodiment to have good processability.

The block copolymer may comprise an α-olefin repeating unit in addition to an ethylene or propylene repeating unit. In this regard, the α-olefin repeating unit may be a repeating unit derived from α-olefins, such as 1-butene, 1-pentene, 4-methyl-1-pentene, 1-hexene, 1-heptene, 1-octene, 1-decene, 1-undecene, 1-dodecene, 1-tetradecene, 1-hexadecene, or 1-itocene; or a repeating unit derived from at least two α-olefins selected from those listed above.

The olefin block copolymer of the embodiment may benefit from the inclusion of the α-olefin repeating unit to have good elasticity and exhibit good heat resistance as a consequence of its blocking characteristic and high degree of crystallization. Further, the olefin block copolymer of the embodiment may have the crystal characteristics and the high crystallization temperature implicitly shown by the above-described SCB distribution characteristic. Such characteristics of the block copolymer of the embodiment lead to fast crystallization of the block copolymer during the melt processing and thus ensure a higher rate of melt processing and more excellence in processability and formability. Therefore, the block copolymer of the embodiment can be used in a wider range of applications requiring heat resistance, overcoming the limitations of olefin-based elastomers in regards to the range of applications.

The block copolymer of the embodiment may be used substantially in all the applications in which the conventional elastomers have been adopted. Moreover, the block copolymer of the embodiment can be used in a wider range of applications in which the conventional olefin-based elastomers are substantially not adopted because of their poor heat resistance but, instead, the rubber materials have been used as a substitute for the olefin-based elastomers. For example, the block copolymer of the embodiment is used to form different kinds of products, including automobile parts or interior materials, such as bumpers, trimming parts, etc.; packaging materials; insulating materials; household products, such as shoe soles, toothbrush grips, flooring materials, knobs, etc.; adhesives, such as pressure-sensitive adhesives, hot melting adhesives, etc.; hoses; pipes; and so forth and adopted in a variety of other applications and uses.

The block copolymer of the embodiment may be used alone or in combination with other polymers, resins, or any kind of additives and used in any form of films, molded bodies, or fibers.

On the other hand, the above-described block copolymer may be prepared by copolymerization of ethylene or propylene with α-olefin in the presence of a defined catalyst composition. Such a preparation method for the olefin block copolymer may include copolymerizing ethylene or propylene with α-olefin at about 70 to 150° C. in the presence of a catalyst composition comprising a metallocene catalyst having a Group IV transition metal and a Lewis basic functional group, and a cocatalyst having a Lewis acidic element and an organic functional group. Particularly, in the preparation method, the metallocene catalyst and the cocatalyst under the above-defined copolymerization temperature conditions takes a first state where the Lewis basic functional group of the metallocene catalyst and the Lewis acid element of the cocatalyst form an acid-base bond. Further, in the first state, an interaction may occur between the Group IV transition metal as the metal center of the metallocene catalyst and the cocatalyst (for example, its organic functional group) forming a Lewis acid-base bond. Further, the metallocene catalyst and the cocatalyst may take the first state and the second state alternately. In the second state, the Group IV transition metal does not interact with the cocatalyst.

It can be predicted that the copolymerization of ethylene or propylene with α-olefin in the presence of such a characteristic catalyst composition comprising the metallocene catalyst and the cocatalyst leads to production of the block copolymer of the embodiment presumably accordingly to the following technical mechanism.

The metallocene catalyst contains a Group IV transition metal as a metal center and a Lewis basic functional group having noncovalent electron pairs (e.g., an oxygen-, nitrogen-, or sulfur-containing functional group), while the cocatalyst contains an organic functional group as well as a Lewis acidic element capable of forming a bond with noncovalent electron pairs (e.g., aluminum or boron). In the case of using the metallocene catalyst and the cocatalyst together in a polymerization system, the catalyst and the cocatalyst at the polymerization temperature may take the first state in which the Lewis basic functional group of the metallocene catalyst and the Lewis acidic element of the cocatalyst form an acid-base bond, and the metal center of the metallocene catalyst interacts with the cocatalyst forming a Lewis acid-base bond with the Lewis acidic element. Further, the catalyst and the cocatalyst may take the second state as an alternative optional state, where the Lewis basic functional group of the metallocene catalyst and the Lewis acidic element of the cocatalyst form a Lewis acid-base bond, but no interaction between the metal center of the metallocene catalyst and the cocatalyst forming the Lewis acid-base bond. Particularly, the catalyst and the cocatalyst at the polymerization temperature may take the first and second states alternately. This takes place presumably because the energy gap between the first and second states is as low as about 10 kcal/mol or less or about 5 kcal/mol or less to allow a shift between the first and second states with ease at the polymerization temperature.

In this regard, the energy gap can be measured by a computational chemical method using a Gaussian program or the like, as apparent to those skilled in the art. The expression that "the Lewis acid-base bond is formed in the first state" implies that the Lewis basic functional group is bound to the Lewis acidic element through a covalent bond or a coordinate bond, or comprehensively means that there occurs an interaction between the Lewis basic functional group and the Lewis acidic element caused by the Van Der Waals force or the equivalent sigmatropic rearrangement. Further, the expression that "the metal center (Group IV transition metal) interacts with the cocatalyst (for example, its organic functional group) forming the Lewis acid-base bond" means that an interaction occurs between the metal center and the cocatalyst by the Van Der Waals force or the equivalent sigmatropic rearrangement. Further, the expression that "no interaction occurs between the metallocene catalyst and the cocatalyst" in the second state means that the metal center (Group IV transition metal) does not interact with the cocatalyst (for example, its organic functional group) forming the Lewis acid-base bond.

However, when the metallocene catalyst and the cocatalyst take the first state, the space around the metal center of the metallocene catalyst becomes narrow due to the Lewis acid-base bond and the interaction between the metal center of the metallocene catalyst and the cocatalyst forming the Lewis acid-base bond. Thus, ethylene or propylene rather than the relatively bulky α-olefin, in the first state, tends to gain access to the catalyst and involves polymerization. When the metallocene catalyst and the cocatalyst take the second state, the space around the metal center of the metallocene catalyst becomes wide to make the relatively bulky α-olefin monomer more accessible to the catalyst, ending up with polymerization of α-olefin at higher content.

In this manner, the specific catalyst system of the metallocene catalyst and the cocatalyst can be used to alternately take the first state involving polymerization of ethylene or propylene at a higher content and the second state involving polymerization of α-olefin at higher content. Consequently, the olefin block copolymer prepared by the above-described method includes a hard segment containing a relatively high mole fraction of the ethylene or propylene repeating unit, and a soft segment containing a relatively high mole fraction of the α-olefin repeating unit. In particular, the olefin block copolymer can be prepared with ease by using a simple catalyst system rather than a complicated catalyst system comprising two transition metal catalysts and thus endowed with such a high degree of crystallization and a novel SCB distribution characteristic as described above.

In a preparation method for the olefin block copolymer, the polymerization temperature may be about 70 to 150° C., about 80 to 120° C., about 90 to 110° C., or about 90 to 100° C. Under the polymerization temperature conditions, energy shifts occur between the first and second states with ease, and the respective monomers involve polymerization reactions efficiently. It is thus possible under the polymerization temperature conditions to obtain an olefin block copolymer having a high degree of blocking and good crystal properties with high yield.

The above-described preparation method may use a metallocene catalyst containing a Group IV transition metal as a metal center and a Lewis basic functional group (e.g., an oxygen-, nitrogen-, or sulfur-containing functional group having noncovalent electron pairs). If not specifically limited in the type, the metallocene catalyst may include a metallocene compound represented by the following Chemical Formula 1, in consideration of the characteristic of appropriately taking the first and second states alternately and the polymerization activity for ethylene or propylene and α-olefin in each state.

[Chemical Formula 1]

In the Chemical Formula 1, R1 to R17 are the same or different from one another and independently selected from hydrogen, halogen, $C_1$-$C_{20}$ alkyl, $C_2$-$C_{20}$ alkenyl, $C_6$-$C_{20}$ aryl, $C_7$-$C_{20}$ alkylaryl, or $C_7$-$C_{20}$ arylalkyl; L is $C_1$-$C_{10}$ linear or branched alkylene; D is —O—, —S—, or —N(R)—, wherein R is hydrogen, halogen, $C_1$-$C_{20}$ alkyl, $C_2$-$C_{20}$ alkenyl, or $C_6$-$C_{20}$ aryl; A is hydrogen, halogen, $C_1$-$C_{20}$ alkyl, $C_2$-$C_{20}$ alkenyl, $C_6$-$C_{20}$ aryl, $C_7$-$C_{20}$ alkylaryl, $C_7$-$C_{20}$ arylalkyl, $C_2$-$C_{20}$ alkoxyalkyl, $C_2$-$C_{20}$ heterocycloalkyl, or $C_5$-$C_{20}$ heteroaryl, wherein when D is —N(R)—, R is bound to A to form a nitrogen-containing heterocyclic ring such as five- to eight-membered heterocyclic rings (e.g., piperidinyl or pyrrolidinyl); M is a Group IV transition metal; and X1 and X2 are the same or different from each other and independently selected from halogen, $C_1$-$C_{20}$ alkyl, $C_2$-$C_{20}$ alkenyl, $C_6$-$C_{20}$ aryl, nitro, amido, $C_1$-$C_{20}$ alkylsilyl, $C_1$-$C_{20}$ alkoxy, or $C_0$-$C_{20}$ sulfonate.

Such a metallocene catalyst contains a functional group denoted by "A-D-" where A is bound to D (e.g., oxygen, sulfur, or nitrogen) having a noncovalent electron pair, and a Group IV transition metal as a metal center. Thus, the noncovalent electron pair contained in the "A-D-" functional group serves as a Lewis base to form an acid-base bond with the Lewis acidic element of the cocatalyst, and the Group IV transition metal M interacts with the cocatalyst. As a result, the metallocene catalyst and the cocatalyst take the first and second states alternately to initiate copolymerization of ethylene or propylene with α-olefin.

Each substituent of the metallocene compound represented by the Chemical Formula 1 can be described more specifically as follows.

The $C_1$-$C_{20}$ alkyl group includes a linear or branched alkyl group. The specific examples of the alkyl group may include, but are not limited to, methyl, ethyl, propyl, isopropyl, n-butyl, tert-butyl, pentyl, hexyl, heptyl, octyl, etc.

The $C_2$-$C_{20}$ alkenyl group includes a linear or branched alkenyl group. The specific examples of the alkenyl group may include, but are not limited to, aryl, ethenyl, propenyl, butenyl, pentenyl, etc.

The $C_6$-$C_{20}$ aryl group includes a monocyclic or condensed-cyclic aryl group. The specific examples of the aryl group may include, but are not limited to, phenyl, biphenyl, naphthyl, phenanthrenyl, fluorenyl, etc.

The $C_5$-$C_{20}$ heteroaryl group includes a monocyclic or condensed-cyclic heteroaryl group. The specific examples of the heteroaryl group may include, but are not limited to, carbazolyl, pyridyl, quinoline, isoquinoline, thiophenyl, furanyl, imidazole, oxazolyl, thiazolyl, triazine, tetrahydropyranyl, tetrahydrofuranyl, etc.

The specific examples of the $C_1$-$C_{20}$ alkoxy group may include, but are not limited to, methoxy, ethoxy, phenyloxy, cyclohexyloxy, etc.

The specific examples of the Group IV transition metal may include, but are not limited to, titanium, zirconium, hafnium, etc.

With a view to ensuring the appropriate activity and characteristics of the metallocene compound of the Chemical Formula 1, R1 to R17 of the Chemical Formula 1 may be independently hydrogen, methyl, ethyl, propyl, isopropyl, n-butyl, tert-butyl, pentyl, hexyl, heptyl, octyl, or phenyl; or any one of other different substituents.

In the metallocene compound, L of the Chemical Formula 1 may be a linear or branched $C_4$-$C_8$ alkylene group. Further, the alkylene group may be unsubstituted or substituted with a $C_1$-$C_{20}$ alkyl group, a $C_2$-$C_{20}$ alkenyl group, or a $C_6$-$C_{20}$ aryl group.

In the metallocene compound, A of the Chemical Formula 1 may be hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, tetrahydrofuranyl, etc.; or any one of other different substituents.

The specific examples of the metallocene compound represented by the Chemical Formula 1 may include, but are not limited to, the compounds represented by the following Chemical Formula 2:

[Chemical Formula 2]

On the other hand, the above-described preparation method may use a cocatalyst containing a Lewis acidic element (e.g., aluminum, boron, etc.) and an organic functional group, in combination with the above-described metallocene catalyst. Such a cocatalyst is not specifically limited in its type, but the representative examples of the cocatalyst may include the cocatalyst compounds represented by the following Chemical Formula 3:

—[Al(R18)-O]$_n$—  [Chemical Formula 3]

In the Chemical Formula 3, R18's are the same or different from one another and independently a $C_1$-$C_{20}$ hydrocarbon or a halogen-substituted $C_1$-$C_{20}$ hydrocarbon; and n is an integer from 2 (e.g., an integer from 2 to 6).

Such a cocatalyst contains aluminum as a Lewis acidic element and an organic functional group denoted by R18. The cocatalyst not only forms a Lewis acid-base bond properly with the metallocene catalyst of the Chemical Formula 1 but also interacts with the Group IV transition metal of the metallocene catalyst. As the energy gap between the first and second states is not so high in the case of using the metallocene catalyst of the Chemical Formula 1, the metallocene catalyst and the cocatalyst take the first and second states alternately under the above-defined copolymerization temperature conditions to initiate the copolymerization of ethylene or propylene with α-olefin. Such a cocatalyst is used in combination with, for example, the above-described metallocene catalyst of the Chemical Formula 1 to have an appropriate polymerization activity for ethylene or propylene and α-olefin. Therefore, the use of the cocatalyst together with a proper metallocene catalyst can make it easier to obtain the olefin block copolymer of the embodiment with a high degree of crystallization or the like.

The specific examples of the cocatalyst compound of the Chemical Formula 3 may include methyl aluminoxane, ethyl aluminoxane, isobutyl aluminoxane, butyl aluminoxane, etc., among which methyl aluminoxane is typically used.

The catalyst composition containing the metallocene catalyst and the cocatalyst can be prepared by a typical method that involves having the cocatalyst in contact with the metallocene catalyst. In the case of using an additional cocatalyst, the cocatalysts can be put in contact with the metallocene catalyst simultaneously or sequentially. Considering the interaction between the metallocene catalyst and the cocatalysts, it may be more beneficial to bring the cocatalyst of the Chemical Formula 3 containing a Lewis acidic element in contact with the metallocene catalyst prior to the other cocatalyst.

The molar ratio of the metallocene catalyst to the cocatalyst may be in the range of about 1/5,000 to 1/2, about 1/1,000 to 1/10, or about 1/500 to 1/20. Using the metallocene catalyst and the cocatalyst within the defined range of molar ratio not only ensures an appropriate interaction between the metallocene catalyst and the cocatalyst but prevents a deterioration of the activity of the metallocene catalyst caused by an excess of the cocatalyst and a rise of the unit cost of the process.

In the preparation of the catalyst composition, there may be used a solvent, including an aliphatic hydrocarbon solvent (e.g., pentane, hexane, heptane, etc.) or an aromatic hydrocarbon solvent (e.g., benzene, toluene, etc.). Further, the metallocene catalyst or the cocatalyst may be supported on a catalyst support such as silica, alumina, or the like.

In the preparation of the block copolymer of the embodiment, an olefin block copolymer can be prepared by a method that includes the step of copolymerizing an ethylene or propylene monomer with an α-olefin monomer in the presence of the above-described catalyst composition containing the metallocene catalyst and the cocatalyst. In this regard, the α-olefin may include at least one selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

Further, the above-described preparation method may be carried out under the typical conditions for the preparation of olefin copolymers except for those specified above. Specific examples of the copolymerization conditions are described in the after-mentioned Examples.

Hereinafter, some examples will be given for better understanding of the present description, but the following examples are presented only for a mere illustration though, and the scope of the present description should not be construed to be defined thereby.

Preparation Example 1

Preparation of Ligand Compound 1.0 mol of a tert-Bu-O—(CH$_2$)$_6$MgCl solution was obtained as a Grignard reagent through a reaction of tert-Bu-O—(CH$_2$)$_6$Cl and Mg(O) in THF solvent. The Grignard reagent thus obtained was added into a flask containing a MeSiCl$_3$ compound (176.1 mL, 1.5 mol) and THF (2.0 L) at −30° C., and the resultant solution was stirred at the room temperature for 8 hours or longer and then subjected to filtration. The filtrate was dried under vacuum to obtain a compound of tert-Bu-O—(CH$_2$)$_6$SiMeCl$_2$ (92% yield).

Fluorene (3.33 g, 20 mmol), hexane (100 mL), and methyl tert-butyl ether (MTBE) (1.2 mL, 10 mmol) were placed in a reactor at −20° C. 8 mL of n-BuLi (2.5 M, in hexane) was slowly added to the reactor, which was then agitated at the room temperature for 6 hours. After completion of the agitation, the reactor was cooled down to −30° C. Then, the fluorenyl lithium solution prepared above was slowly added to a solution of tert-Bu-O—(CH$_2$)$_6$SiMeCl$_2$ (2.7 g, 10 mmol) dissolved in hexane (100 mL) at −30° C. for one hour. After agitation at the room temperature for 8 hours or longer, the resultant solution was subjected to extraction with an addition of water and then evaporation to obtain (tert-Bu-O—(CH$_2$)$_6$MeSi(9-C$_{13}$H$_{10}$)$_2$ (5.3 g, 100% yield). The structure of the ligand compound was identified through $^1$H-NMR.

$^1$H NMR (500 MHz, CDCl$_3$): −0.35 (MeSi, 3H, s), 0.26 (Si-CH$_2$, 2H, m), 0.58 (CH$_2$, 2H, m), 0.95 (CH$_2$, 4H, m), 1.17 (tert-BuO, 9H, s), 1.29 (CH$_2$, 2H, m), 3.21 (tert-BuO-CH$_2$, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

Preparation of Metallocene Compound

At −20° C., 4.8 mol of n-BuLi (2.5 M in hexane) was slowly added to a solution of (tert-Bu-O—(CH$_2$)$_6$MeSi(9-C$_{13}$H$_{10}$)$_2$ (3.18 g, 6 mmol)/MTBE (20 mL). Heated up to the room temperature, the mixture was allowed to react for 8 hours or longer. The slurry solution of dilithium salt thus obtained was slowly added to a slurry solution of ZrCl$_4$(THF)$_2$ (2.26 g, 6 mmol)/hexane (20 mL) at −20° C., and the resulting mixture was allowed to react at the room temperature for 8 more hours or longer. The precipitate thus obtained was filtered out and washed with hexane several times to obtain (tert-Bu-O—(CH$_2$)$_6$MeSi(9-C$_{13}$H$_9$)$_2$ZrCl$_2$ as a red solid (4.3 g, 94.5% yield).

$^1$H NMR (500 MHz, C6D6): 1.15 (tert-BuO, 9H, s), 1.26 (MeSi, 3H, s), 1.58 (Si—CH2, 2H, m), 1.66 (CH2, 4H, m), 1.91 (CH2, 4H, m), 3.32 (tert-BuO-CH2, 2H, t), 6.86 (Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

Preparation Example 2

Preparation of Ligand Compound

The procedures were performed in the same manner as described in Preparation Example 1, excepting that tert-Bu-O—(CH$_2$)$_4$Cl was used in place of tert-Bu-O—(CH$_2$)$_6$Cl to prepare (tert-Bu-O—(CH$_2$)$_4$MeSi(9-C$_{13}$H$_{10}$)$_2$ as a ligand compound with almost the same yield as acquired in Preparation Example 1. The structure of the ligand compound was identified through $^1$H-NMR.

$^1$H NMR (500 MHz, C6D6): −0.40 (MeSi, 3H, s), 0.30 (CH$_2$, 2H, m), 0.71 (CH$_2$, 2H, m), 1.05 (tert-BuO, 9H, s), 1.20 (CH$_2$, 2H, m), 2.94 (tert-BuO-CH$_2$, 2H, t), 4.10 (Flu-9H, 2H, s), 7.16 (Flu-H, 4H, m), 7.35 (Flu-H, 4H, m), 7.35 (Flu-H, 2H, d), 7.43 (Flu-H, 2H, d), 7.77 (Flu-H, 4H, d).

Preparation of Metallocene Compound

The procedures were performed in the same manner as described in Preparation Example 1, excepting that (tert-Bu-O—(CH$_2$)$_4$MeSi(9-C$_{13}$H$_{10}$)$_2$ was used in place of (tert-Bu-O—(CH$_2$)$_6$MeSi(9-C$_{13}$H$_{10}$)$_2$ to prepare (tert-Bu-O—(CH$_2$)$_4$MeSi(9-C$_{13}$H$_9$)$_2$ZrCl$_2$ with almost the same yield.

$^1$H NMR (500 MHz, C6D6): 1.14 (tert-BuO, 9H, s), 1.26 (MeSi, 3H, s), 1.90 (CH2, 2H, m), 1.99 (CH2, 2H, m), 2.05 (CH2, 2H, m), 3.39 (tert-BuO-CH2, 2H, t), 6.84 (Flu-H, 2H, m), 6.90 (Flu-H, 2H, m), 7.15 (Flu-H, 4H, m), 7.60 (Flu-H, 6H, d), 7.80 (Flu-H, 2H, d).

Preparation Example 3

Preparation of Ligand Compound

The procedures were performed in the same manner as described in Preparation Example 1, excepting that tert-Bu-O—(CH$_2$)$_8$Cl was used in place of tert-Bu-O—(CH$_2$)$_6$Cl to prepare (tert-Bu-O—(CH$_2$)$_8$MeSi(9-C$_{13}$H$_{10}$)$_2$ as a ligand compound with almost the same yield as acquired in Preparation Example 1. The structure of the ligand compound was identified through $^1$H-NMR.

$^1$H NMR (500 MHz, C6D6): −0.40 (MeSi, 3H, s), 0.29 (CH$_2$, 2H, m), 0.58 (CH$_2$, 2H, m), 0.83 (CH$_2$, 2H, m), 0.95 (CH$_2$, 2H, m), 1.05 (CH$_2$, 2H, m), 1.14 (tert-BuO, 9H, s), 1.30 (CH$_2$, 2H, m), 1.64 (CH$_2$, 2H, m), 3.27 (tert-BuO-CH2, 2H, t), 4.13 (Flu-9H, 2H, s), 7.17 (Flu-H, 4H, m), 7.26 (Flu-H, 4H, m), 7.37 (Flu-H, 2H, d), 7.43 (Flu-H, 2H, d), 7.78 (Flu-H, 4H, d).

Preparation of Metallocene Compound

The procedures were performed in the same manner as described in Preparation Example 1, excepting that (tert-Bu-O—(CH$_2$)$_8$MeSi(9-C$_{13}$H$_{10}$)$_2$ was used in place of (tert-Bu-O—(CH$_2$)$_6$MeSi(9-C$_{13}$H$_{10}$)$_2$ to prepare (tert-Bu-O—(CH$_2$)$_8$MeSi(9-C$_{13}$H$_9$)$_2$ZrCl$_2$ with almost the same yield.

¹H NMR (500 MHz, C6D6): 1.17 (tert-BuO, 9H, s), 1.29 (MeSi, 3H, s), 1.41 (CH2, 4H, m), 1.49 (CH2, 2H, m), 1.64 (CH2, 2H, m), 1.89 (CH2, 4H, m), 1.94 (CH2, 2H, m), 3.30 (tert-BuO-CH2, 2H, t), 6.81 (Flu-H, 2H, m), 6.90 (Flu-H, 2H, m), 7.14 (Flu-H, 4H, m), 7.60 (Flu-H, 4H, d), 7.65 (Flu-H, 2H, d), 7.78 (Flu-H, 2H, d).

Examples 1 to 13

Into a 500 mL glass reactor were sequentially added toluene, 1-hexene (1-octene in Example 2), and a solution containing 10 wt. % of methyl aluminoxane (MAO) in toluene. Subsequently, a 1 mM toluene solution of the compound of the Preparation Example 1 (i.e., (tert-Bu-O—(CH$_2$)$_6$MeSi(9-C$_{13}$H$_9$)$_2$ZrCl$_2$) and then ethylene were added into the reactor to initiate a polymerization reaction. The reactants were stirred for a predetermined period of time and, after ventilation, poured into an ethanol/HCl solution. After stirring and filtration, the resultant solution was washed with ethanol and removed of the solvent through evaporation to obtain an olefin block copolymer.

In the respective Examples, olefin block copolymers were prepared while varying the content of the 1-hexene (or 1-octene) monomer in the entire content of monomers including a 1-hexene (or 1-octene) monomer and an ethylene monomer.

Comparative Example 1

An olefin-based elastomer, LUCENE™ LC170 supplied by LG Chem Ltd. was used as the Comparative Example 1.

Comparative Example 2

An olefin block copolymer (ethylene-1-octene block copolymer; melt index (190° C., 2.16 kg): 5 g/10 min; density: 0.866 g/cm³), INFUSE™ 9507 supplied by DOW CHEMICAL COMPANY was used as the Comparative Example 2.

The olefin-1-hexene copolymers prepared in the Examples 1 to 13 and Comparative Examples 1 and 2 were evaluated in regards to properties according to the methods as described in the following Experimental Example.

Figure 1:
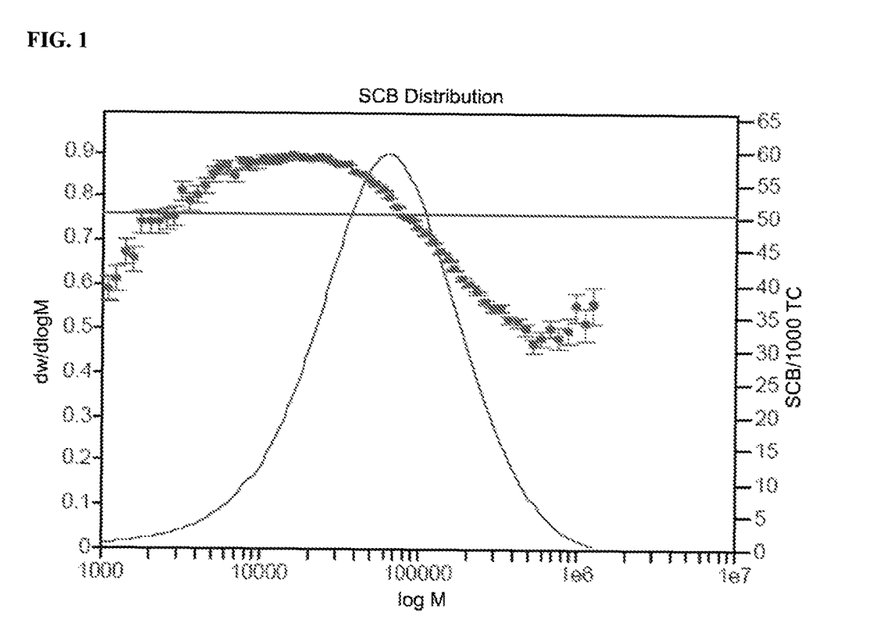
FIGS. 1 and 2 show the molecular weight distribution curve and the distribution of the number of short-chain branches (SCBs) per 1,000 carbon atoms for each olefin block copolymer of Examples 6 to 13.
Figure 2:
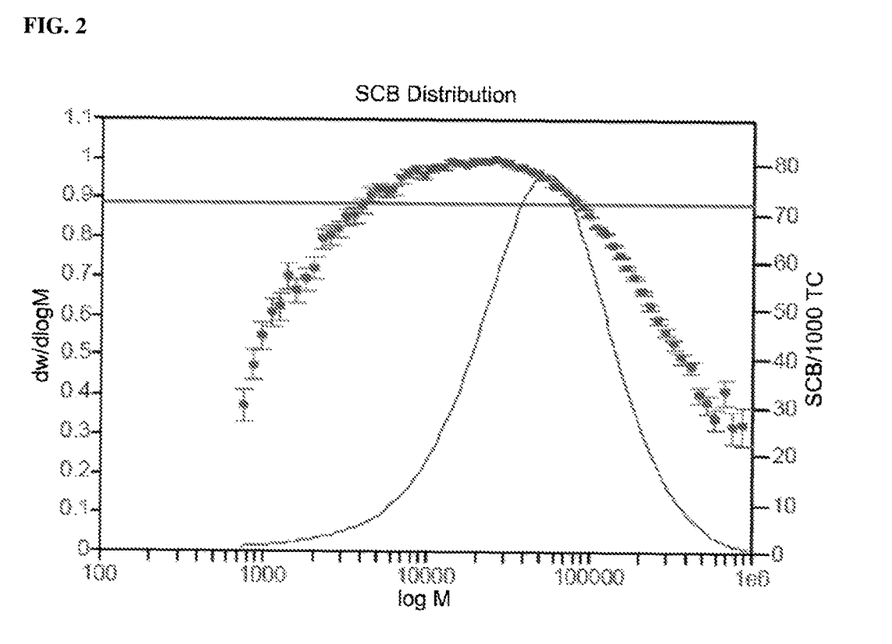
Figure 3:
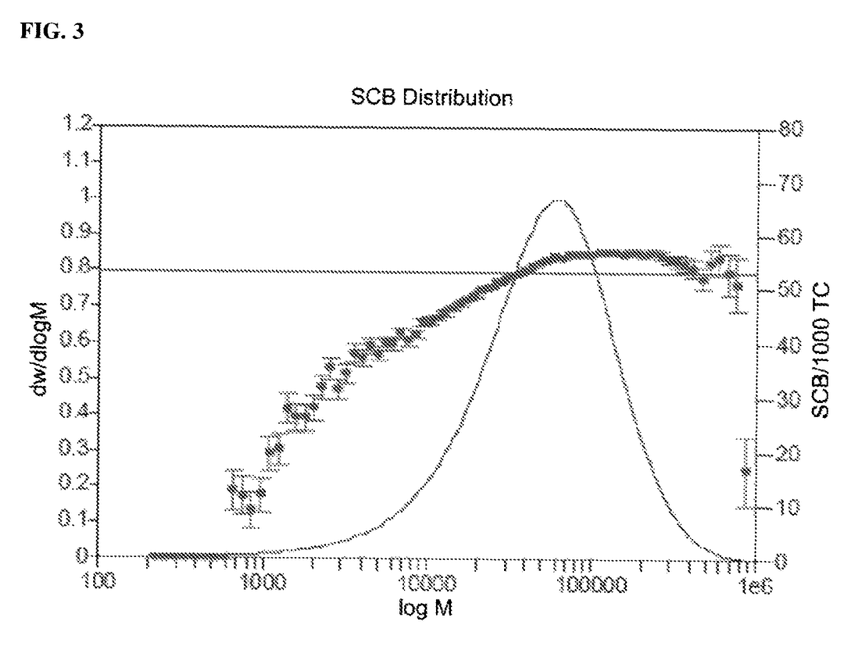
FIG. 3 shows the molecular weight distribution curve and the distribution of the number of SCBs per 1,000 carbon atoms for a block copolymer of Comparative Example 2.

Experimental Example (1) Analysis on Molecular Weight Distribution of Polymer Chains and the Number of SCBs Each copolymer was analyzed by gel permeation chromatography (GPC) to elicit a distribution curve for the molecular weight of the polymer chains constituting the copolymer. Each copolymer was also subjected to an FT-IR analysis to elicit a distribution curve for the number of short-chain branches per 1,000 carbon atoms (Y-axis on the right side) as a function of the molecular weight of the polymers (X-axis). The analytical results for the Examples 6 and 13 and the Comparative Example 2 are shown in FIGS. 1, 2 and 3, respectively. The same results were acquired for the other copolymers.

From the analytical results, each copolymer were further analyzed to determine (1) the number of short-chain branches (average value) per 1,000 carbon atoms in polymer chains; (2) the maximum peak molecular weight Mp; and (3) the existence of a point where the first derivative of the number Y of short-chain branches per 1,000 carbon atoms of each polymer chain with respect to the molecular weight X of each polymer chain was zero (0), and the molecular weight at the point. The results are presented in Table 1. In this regard, (1) the number of short-chain branches per 1,000 carbon atoms) was determined as the average value of the measurements for the number of short-chain branches of the polymer chains in each copolymer of the Examples and presented together with the range of the number of short-chain branches in Table 1.

(2) Density

Each sample in the form of a rectangular bar (64 mm×12.7 mm×3.2 mm) obtained for the WAXD analysis of (1) was measured in regards to density with a Mettler scale. The density measurements are presented in Table 2.

(3) Melting Temperature Tm and Crystallization Temperature Tc

While the temperature maintained in equilibration at 30° C., each copolymer sample was heated up to 200° C. at a rate of 20° C./min and kept at the same temperature to remove its thermal history. Then, the sample was cooled down to 10° C. at a rate of 10° C./min to analyze the exothermic peak corresponding to the crystallization temperature. The copolymer sample was kept at 10° C. for one minute, heated up to 200° C. at a rate of 10° C./min, kept at 200° C. for one minute, and then cooled down to 30° C. to complete the experiment.

According to the measurement results of DSC (Differential Scanning Calorimeter, DSC2920 manufactured by TA instruments), the top of the 10° C./min cooling interval in the temperature-depending heat flow curve was determined as the crystallization temperature Tc. In the 10° C./min heating interval, the wider one of the peaks was picked up as a first peak, the narrower one as a second peak. In this regard, the heating/cooling rate was 10° C./min, and the temperature measurement obtained in the second heating interval was determined as the melting temperature Tm. The melting temperature and the crystallization temperature thus determined are presented in Table 2.

Analysis on the Content of Hard Segment

The content (mole fraction) of the hard segment for Examples and Comparative Examples was calculated using the time domain NMR instrument (TD NMR; Minspec™ manufactured by Bruker Optics) commercially available. Firstly, the TD NMR instrument was adopted to measure the FDI (Free Induction Decay) for the samples of the Examples and the Comparative Examples. FID is the function of time and intensity. The four constants, A, B, T2$_{fast}$, and T2$_{slow}$, in the following Mathematical Formula 1 were varied to elicit a functional formula most approximating the FID functional graph, thereby determining A, B, T2$_{fast}$, and T2$_{slow}$ values for each sample.

It is known that the T2 (spin-spin relaxation time) relaxation for the hard segment as calculated from the functional formula appears fast, while the T2 relaxation for the soft segment is slow. Hence, among the calculated values of A, B, T2$_{fast}$, and T2$_{slow}$, the lower T2 value was determined as the T2 value of the hard segment, that is, T2$_{fast}$, while the higher T2 value was determined as the T2 value of the soft segment, that is, T2$_{slow}$. Through this procedure, the content (mol. %) of the hard segment as well as the constants A and B was calculated. The results of calculation for Examples and Comparative Examples are presented in Table 1.

Intensity=$A$×EXP(−Time/$T2_{fast}$)+ $B$×EXP(−Time/$T2_{slow}$)      [Mathematical Formula 1]

Determine A, B, T2$_{fast}$, and T2$_{slow}$ by fitting.

Hard segment (mol. %)=$A/(A+B)$×100

In the Mathematical Formula 1, intensity and time are values calculated through the FID analysis; T2$_{fast}$ is the T2

(spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

(5) PDI (PolyDispersity Index): Molecular Weight and Molecular Weight Distribution GPC (Gel Permeation Chromatography) was adopted to measure the number average molecular weight (Mn) and the weight average molecular weight (Mw). Then, the weight average molecular weight was divided by the number average molecular weight to determine the molecular weight distribution. The weight average molecular weight and the molecular weight distribution are presented in Table 2.

The respective properties measured by the above-described methods are presented in Tables 1 and 2 as follows.

TABLE 1

| Sample | Content of 1-hexene (or 1-octene) (mol. %) | Average number of SCBs per 1,000 carbon atoms (number range) | Existence a point where first derivative = 0 | Point (molecular weight) where first derivative = 0 | Mp |
|---|---|---|---|---|---|
| Example 1 | 6.6 | 30 (20~39) | O | 25300 | 85800 |
| Example 2 | 9.9 (Oc) | 44 (23~55) | O | 27200 | 93800 |
| Example 3 | 10.6 | 46 (22~59) | O | 24600 | 87900 |
| Example 4 | 11.4 | 49 (25~61) | O | 21800 | 75300 |
| Example 5 | 11.8 | 51 (31~62) | O | 22600 | 73100 |
| Example 6 | 11.8 | 51 (30~63) | O | 19100 | 65500 |
| Example 7 | 12.7 | 54 (35~69) | O | 23700 | 71800 |
| Example 8 | 12.5 | 53 (32~70) | O | 19500 | 69800 |
| Example 9 | 13.0 | 54 (32~71) | O | 23200 | 72500 |
| Example 10 | 12.9 | 53 (31~70) | O | 20000 | 71500 |
| Example 11 | 14.1 | 59 (36~74) | O | 19700 | 65700 |
| Example 12 | 15.0 | 62 (25~76) | O | 22600 | 68700 |
| Example 13 | 17.9 | 72 (20~82) | O | 17900 | 53700 |
| Comparative Example 2 | 16.3 (Oc) | 53 (5~59) | O | 200000 | 62700 |

Note)
Oc means that 1-octene was used as an α-olefin in place of 1-hexene.

TABLE 2

| Sample | Density (g/cm³) | Content of hard segment (mol. %) | Tm (° C.) | Tc (° C.) | Mw | Molecular weight distribution |
|---|---|---|---|---|---|---|
| Example 1 | 0.898 | No measurement | 121 | 107.2 | 119200 | 2.89 |
| Example 2 | 0.886 | 50.8 | 118 | 103.5 | 138000 | 3.10 |
| Example 3 | 0.885 | 47.5 | 120 | 104.3 | 129400 | 2.98 |
| Example 4 | 0.883 | No measurement | 122 | 105.4 | 107700 | 2.87 |
| Example 5 | 0.880 | No measurement | 122 | 105.3 | 101500 | 2.73 |
| Example 6 | 0.876 | No measurement | 121 | 104.6 | 96400 | 2.52 |
| Example 7 | 0.876 | 39.9 | 120 | 105.0 | 99800 | 3.20 |
| Example 8 | 0.875 | No measurement | 122 | 104.0 | 102600 | 2.60 |
| Example 9 | 0.875 | No measurement | 120 | 105.2 | 102200 | 2.74 |
| Example 10 | 0.873 | No measurement | 120 | 104.9 | 96800 | 2.70 |
| Example 11 | 0.869 | No measurement | 121 | 106.5 | 96700 | 2.82 |
| Example 12 | 0.868 | 30.9 | 119 | 105.1 | 98200 | 2.68 |
| Example 13 | 0.865 | 26.6 | 118 | 104.3 | 75200 | 3.20 |
| Comparative Example 1 | 0.873 | — | 56 | 59.0 | 99700 | 2.49 |
| Comparative Example 2 | 0.866 | 30.8 | 124 | 91.0 | 73000 | 2.62 |

Note)

No measurement on the content of hard segment for Examples 1, 4, 5 and 6, and 8 to 11. The content of hard segment was immeasurable for Comparative Example 1 as a random copolymer in which a plurality of blocks or segments were not impossible to define.

Referring to Table 1 and FIGS. 1 and 2, the block copolymers of the Examples include polymer chains each containing about 20 to 100 short-chain branches per 1,000 carbon atoms. With an increase in the molecular weight of the polymer chains, the number of short-chain branches per 1,000 carbon atoms increased (in other words, the first derivative value is a positive number); and, after the point where the first derivative=0, the number of short-chain branches per 1,000 carbon atoms decreased (in other words, the first derivative is a negative number). Further, the point where the first derivative=0 exists in the region where the molecular weight is in the bottom about 10 to 90% of the molecular weight of the polymer chains, more specifically, where the molecular weight is less than the maximum peak molecular weight Mp.

In contrast, referring to Tables 1 and 2 and FIG. 3, the copolymers of the Comparative Examples failed to satisfy the distribution characteristics of the Examples or proved to be different from the copolymers of the Examples. More specifically, the Comparative Example 1 was a random copolymer that was impossible to define in terms of a plurality of blocks or segments such as hard and soft segments and thus totally different from the block copolymers of the Examples. As for the olefin block copolymer of the Comparative Example 2, there existed a region where the number of short-chain branches per 1,000 carbon atoms was less than 20, and the distribution tendency of the number of short-chain branches was different from FIG. 1 or 2, not satisfying the distribution characteristics of the Examples (particularly, the SCB distribution characteristic was different from those of the Examples, since the point where the first derivative=0 existed in the region where the molecular weight was far greater than the maximum peak molecular weight).

Referring to Table 2, the block copolymers of the Examples with the distribution characteristics of Table 1 were much superior to the Comparative Example 1 and similar to the Comparative Example 2 in regards to high melting temperature and good heat resistance. Further, the block copolymers of the Examples had a higher crystallization temperature than the Comparative Examples 1 and 2. This implicitly shows that the block copolymers of the Examples are fast in crystallization during a melt processing and thus superior in processability and formability to the Comparative Examples 1 and 2.

In the block copolymers of the Examples, hard and soft segments were defined and contained at a predetermined content. As prepared from a small amount of α-olefin by block copolymerization, the copolymers of the Examples showed a defined level of density, consequently with good elasticity as an elastomer.

What is claimed is:

1. A method of producing an olefin block copolymer, comprising:
subjecting ethylene or propylene and an α-olefin to copolymerization at a temperature of 70 to 150° C. in the presence of a catalyst composition comprising a metallocene catalyst having a Group IV transition metal and a Lewis base functional group, and a cocatalyst having a Lewis acid element and an organic functional group, wherein the metallocene catalyst comprises a metallocene compound of Chemical Formula 1:

[Chemical Formula 1]

in Chemical Formula 1, R1 to R17 are the same with or different from each other, and are independently hydrogen, a halogen, a C1-C20 alkyl group, a C2-C20 alkenyl group, a C6-C20 aryl group, a C7-C20 alkylaryl group, or a C7-C20 arylalkyl group, respectively, L is a straight or branched chain C1-C10 alkylene group, D is —O—, —S— or —N(R)—, wherein R is hydrogen, a halogen, a C1-C20 alkyl group, a C2-C20 alkenyl group, or a C6-C20 aryl group, A is hydrogen, a halogen, a C1-C20 alkyl group, a C2-C20 alkenyl group, a C6-C20 aryl group, a C7-C20 alkylaryl group, a C7-C20 arylalkyl group, a C2-C20 alkoxy alkyl group, a C2-C20 heterocyclic alkyl group, or a C5-C20 heteroaryl group, and when the D is —N(R)—, R can be linked with A to form a heterocycle comprising nitrogen, for example, a five to eight membered heterocycle such as piperidinyl or pyrrolidinyl moiety, M is a Group IV transition metal, X1 and X2 are the same with or different from each other, and are independently a halogen, a C1-C20 alkyl group, a C2-C20 alkenyl group, a C6-C20 aryl group, a nitro group, an amido group, a C1-C20 alkylsilyl group, a C1-C20 alkoxy group, or a C0-C20 sulfonate group, respectively;

wherein at the copolymerization temperature, there occur alternatively between the metallocene catalyst and the cocatalyst a first state in which the Lewis base functional group and the Lewis acid element form an acid-base bond and a second state in which the metallocene catalyst and the cocatalyst has no interaction therebetween;

wherein the Group IV transition metal of the metallocene catalyst and the organic functional group of the cocatalyst do interaction with each other in the first state;

wherein the olefin block copolymer comprises a plurality of blocks or segments, each comprising an ethylene or propylene repeating unit and an α-olefin repeating unit at different mole fractions, and the olefin block copolymer comprises polymer chains comprising 20 to 100 short-chain branches (SCBs) per 1,000 carbon atoms; and wherein a point where a first derivative of the number Y of the SCBs per 1,000 carbon atoms of each polymer chain with respect to the molecular weight X of the polymer chain is 0 exists between the minimum values of the molecular weight X and the maximum peak molecular weight Mp of the block copolymer.

2. The method of producing an olefin block copolymer in accordance with claim 1, wherein the α-olefin is at least one selected from the group consisting of 1-butene, 1-pentene, 4-methyl-1-pentene, 1-hexene, 1-heptene, 1-octene, 1-decene, 1-undecene, 1-dodecene, 1-tetradecene and 1-hexadecene.

3. The method of producing an olefin block copolymer in accordance with claim 1, wherein the cocatalyst comprises a compound of Chemical Formula 3:

—[Al(R18)-O]$n$-    [Chemical Formula 3]

in Chemical Formula 3, R18s are the same with or different from each other, and are independently a C1-C20 hydrocarbon; or a C1-C20 hydrocarbon substituted with a halogen; and n is an integer of at least two.

4. The method of producing an olefin block copolymer in accordance with claim 1, wherein the first derivative is a positive number in a region where the molecular weight X is less than at the point where the first derivative is 0.

5. The method of producing an olefin block copolymer in accordance with claim 1, wherein the first derivative is a negative number in a region where the molecular weight X is greater than at the point where the first derivative is 0.

6. The method of producing an olefin block copolymer in accordance with claim 1, wherein the olefin block copolymer comprises a hard segment comprising a first mole fraction of the α-olefin repeating unit, and a soft segment comprising a second mole fraction of the α-olefin repeating unit,
wherein the second mole fraction is greater than the first mole fraction.

7. The method of producing an olefin block copolymer in accordance with claim 6, wherein the mole fraction of the α-olefin repeating unit contained in the entire block copolymer has a value between the first and second mole fractions.

8. The method of producing an olefin block copolymer in accordance with claim 6, wherein the olefin block copolymer comprises 20 to 95 mol. % of the hard segment and 5 to 80 mol. % of the soft segment.

9. The method of producing an olefin block copolymer in accordance with claim 6, wherein the olefin block copolymer comprises 80 to 98 mol. % of the ethylene or propylene repeating unit and a remaining content of the α-olefin repeating unit.

* * * * *